United States Patent [19]

Nolf

[11] 4,246,687
[45] Jan. 27, 1981

[54] BRANCH-OFF METHOD
[75] Inventor: Jean-Marie E. Nolf, Beauvechain, Belgium
[73] Assignee: N.V. Raychem S.A., Kessel, Belgium
[21] Appl. No.: 26,573
[22] Filed: Apr. 3, 1979
[30] Foreign Application Priority Data
Apr. 4, 1978 [GB] United Kingdom ............. 13123/78
[51] Int. Cl.³ ..................... B29C 27/00; B23P 11/02
[52] U.S. Cl. ............................ 29/447; 174/DIG. 8; 264/230; 403/273
[58] Field of Search .................... 264/230, DIG. 71; 156/84, 85, 86; 428/913; 403/273; 174/DIG. 8; 29/447

[56] References Cited
U.S. PATENT DOCUMENTS

| 2,027,962 | 1/1936 | Currie | 18/55 |
| 3,086,242 | 4/1963 | Cook et al. | 18/1 |
| 3,174,851 | 3/1965 | Buchler et al. | 75/170 |
| 3,351,463 | 11/1967 | Rozner et al. | 75/170 |
| 3,379,218 | 4/1968 | Coucle | 138/99 |
| 3,445,898 | 5/1969 | Goodrich | 264/230 |
| 3,753,700 | 8/1973 | Harrison et al. | 75/175.5 |
| 3,759,552 | 9/1973 | Levinsohn | 285/175 |
| 3,957,382 | 5/1976 | Greuel, Jr. et al. | 403/27 |
| 3,959,052 | 5/1976 | Stanek | 264/230 |
| 4,036,669 | 7/1977 | Brooks et al. | 148/11.5 C |
| 4,067,752 | 1/1978 | Brooks et al. | 148/11.5 R |
| 4,123,047 | 10/1978 | Koht et al. | 269/238 |

FOREIGN PATENT DOCUMENTS

| 2603878 | 8/1976 | Fed. Rep. of Germany. |
| 2603911 | 8/1976 | Fed. Rep. of Germany. |
| 2709717 | 9/1977 | Fed. Rep. of Germany. |
| 2748894 | 5/1978 | Fed. Rep. of Germany. |
| 2748383 | 5/1978 | Fed. Rep. of Germany. |
| 2900518 | 7/1979 | Fed. Rep. of Germany. |
| 1155470 | 6/1969 | United Kingdom. |
| 1211988 | 11/1970 | United Kingdom. |
| 1245119 | 9/1971 | United Kingdom. |
| 1327441 | 8/1973 | United Kingdom. |
| 1327442 | 8/1973 | United Kingdom. |
| 1346470 | 2/1974 | United Kingdom. |
| 1431167 | 4/1976 | United Kingdom. |
| 1440524 | 6/1976 | United Kingdom. |
| 1440810 | 6/1976 | United Kingdom. |

OTHER PUBLICATIONS

NASA-SP5110, "55-Nitirsol-The Alloy with a Memory: Its Physical Metallurgy, Properties, and Applications" C.M. Jackson et al., NASA, Wash. D. C. 1972, pp. 1-82.
N. Nakanishi et al., Scripta Metallurgica 5, pp. 443-440.
K. Enami et al., Scripta Metallurgica 5, pp. 663-668.

Primary Examiner—James B. Lowe
Attorney, Agent, or Firm—Lyon & Lyon

[57] ABSTRACT

A branch-off seal between a heat-shrinkable sleeve, made for example from a cross-linked polymeric material, and two or more substrates such as electric cables or other utility lines is effected by using a fork member. The end portion of the heat-shrinkable sleeve is threaded between the prongs of the fork member so that, on recovery, the heat-shrinkable material tightens and at least two prongs abut the outer surfaces of the sleeve which surround the substrates so as to retain the fork member in position. The fork is preferably made from a metal such as stainless steel or aluminium.

23 Claims, 15 Drawing Figures

BRANCH-OFF METHOD

This invention relates to heat-recoverable articles and their use in the insulation and protection of substrates such as supply lines.

Heat-recoverable articles, especially heat-shrinkable articles, are now widely used in many areas where insulation, sealing and encapsulation are required. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,382. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wires, cables and pipes. However, there are other applications where it is desirable to provide a connecting, insulating or protective heat-recoverable member for elongated objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218 and British Pat. Nos. 1,155,470; 1,211,988 and 1,346,479. In other applications, however, the sheet may be held in the wrapped-up configuration during recovery by means of an adhesive which may, in some cases, be applied on site.

Heat-recoverable sleeves and wrap-around sleeves have been successfully employed in many fields of application. However, problems may arise when two or more substrates such as supply lines, for example cables or pipes, have to be sealed at one position. This problem, which is known as "branch-off", may occur, for example, at the outlet of a heat-recoverable part. Amongst areas in which this problem is typically encountered there may especially be mentioned the outlets of the splice cases described and claimed in British Pat. No. 1,431,167, the feed-through devices described and claimed in British Pat. No. 1,245,119 and the duct seal devices described and claimed in German Offenlegungsschrift No. 27 48 894.

One effective solution for tubular sleeves has been to use moulded heat-shrinkable parts provided with preformed outlets for the individual supply lines. However, in general such moulded parts have to be made to suit a specific application. Their versatility has been improved by the use of end caps which seal outlets which are not needed in a specific operation, as described and claimed in German Offenlegungsschrift No. 27 48 383, but they are nonetheless expensive and thus economically infeasible in many routine applications.

Another, less expensive, solution which has frequently been employed is to use mastic tape to seal the gap between the supply lines so that, on recovery, a proper encapsulation is formed at the end of the heat-recoverable part. However, the use of such tape requires skill on the part of the installer and the method is not applicable to large parts. In addition, the mastic may degrade the overall performance of products which are provided with an inner lining or coating of a hot-melt adhesive.

In German Offenlegungsschrift No. 29 00 518 an effective branch-off is obtained by forming the individual outlets by means of a suitably shaped chip made from a relatively rigid material. In accordance with the invention therein described there is provided a method of forming a branch-off seal between a heat-shrinkable sleeve and at least two substrates such as supply lines, which comprises the steps of (a) positioning a clip having at least two elongate legs over the outer surface of the heat-shrinkable sleeve at the end thereof so as to form at least two terminal conduits;

(b) positioning the substrates within the conduits; and (c) applying heat so as to effect shrinkage and to form the desired seal.

Steps (a) and (b) may be effected in any order or simultaneously, for example in many cases the clip will be pushed into place after the sleeve has been positioned about the substrates.

In its simples form the clip used in the invention of German Offenlegungsschrift No. 29 00 518 is U-shaped and its two legs are slid over the outer surfaces of the pinched together heat-recoverable sleeve or wrap-around sleeve, or over the surfaces of the heat-recoverable sleeve or wrap-around sleeve and another co-operating surface.

However, in preferred embodiments the clip has three legs and the central leg passes into the heat-recoverable sleeve whilst the outer legs pass outside it, in this way each of the two layers of the heat-recoverable material is pinched between a central leg and an outer leg. The central leg is advantageously provided on each side with a layer of hot-melt adhesive which flows during recovery to seal the gap between the conduits which have been formed.

Whilst the clips described in German Offenlegungsschrift No. 29 00 518 have proved extremely useful in providing effective branch-offs at the end of heat-recoverable sleeves in applications where the supply lines, e.g. cables passing out through the branch-off conduits are close together, it is difficult to use them to form a properly sealed branch-off termination where the distance between the supply lines is large and cannot be altered. For example, in some countries it is common to enclose a telephone cable junction in a lead box which is provided with spaced-apart lead conduits for the incoming and outgoing cables. The cables may, for example, vary between 18 mm and 95 mm in diameter and the distance between the conduits may be as great as 30 mm. In such a situation gaps and leaks would remain after recovery even if several clips were installed between the cables.

The present invention provides a method of forming a branch-off seal between a heat-shrinkable sleeve and at least two substrates such as supply lines which comprises threading an end portion of the sleeve which is positioned between the two substrates about the prongs of a fork member so that, on recovery, the heat-shrinkable material tightens within the prongs of said fork member and at least two of the prongs of the fork member abut the outer surfaces of the sleeve surrounding the substrates so as to retain the fork member firmly in position.

References to threading the sheet material between the prongs of the fork member in this specification include all operations which result in a final arrangement in which the two layers of sheet material pass above one prong of the fork member and below another, preferably adjacent, member. As will be obvious from the following description, this effect can, in most cases, be most easily achieved by a positive installation of the fork member on the end of the heat-shrinkable sleeve member. In general, none of the prongs of the fork member will be inserted into the heat-shrinkable sleeve itself although, in certain applications, it may be advantageous to provide a further prong (which does not take part in the threading operation) for this purpose.

The essential concept of the present invention is to accommodate the slack heat-recoverable material between the adjacent supply lines by means of a pronged fork member which functions during recovery in a manner similar to that of a buckle of a belt. The fork member is sufficiently wide that it is forced by the recovery forces of the heat-shrinkable material into contact with the outer surfaces of the supply lines (or, more correctly, into contact with the heat-shrinkable sleeve material surrounding those supply lines) so as further to enhance the tightening effect and also to ensure that it is properly positioned after recovery. It will be appreciated, therefore, that the width of the fork member across the prongs is at least as great as the distance between the substrates (allowing for the thickness of the sleeve material surrounding them) and is advantageously significantly wider than the gap between them.

Given this basic concept many variations are possible. For example the fork member may comprise 2, 3, 4 or more prongs and may be flat or, in other embodiments, may be shaped so that one or more of the prongs lies above or below the plane of the remaining prongs. In other applications the lengths of the individual prongs may differ so as to facilitate installation of the fork member. In some instances it may be appropriate to provide the fork member with means for properly positioning it in relation to the supply lines prior to shrinkage, for example the base of the fork member may be provided with a spacer member which is dimensioned to fit between the supply lines. Such a spacer member may be deformable so that its shape can be changed according to the distance between the supply lines and may be so attached to the fork member that it can readily be broken off or otherwise removed after recovery.

In other embodiments the base of the fork member may be provided with ears which rest on the supply lines as they pass out from the heat-shrinkable sleeve. However, in these and other similar embodiments care should be taken that the parts of the fork member which come into direct contact with the supply lines do not damage the supply lines during shrinkage. For example care should be taken that the fork member does not cut or bite into the jackets of insulated cables.

The fork member may advantageously be made from a thermally conductive material and/or is so constructed that it facilitates the application of heat to the heat-recoverable material in its vicinity (for example, it may be constructed as described and claimed in German OS No. 2 756 021). In other instances the heat-shrinkable sleeve may be provided with internal or self-contained heating means in which case the fork member may be made from a non-thermally conductive material. In certain applications, care must be taken that the fork member does not become too hot and burn the substrates e.g. the jackets of cables and it may be appropriate to insulate at least some parts of the fork member, e.g. the outer prongs thereof, to prevent possible damage.

The fork member should in general have good tensile strength and is preferably made from a metal including, for example, steel, brass, beryllium copper and aluminium. A steel fork member may be made by stamping from sheet material and an aluminium fork member may be made, for example, by mould injection. In each case, a deburring operation may be necessary to remove sharp edges.

The fork member may, however, be deformable (this being not necessarily inconsistent with overall strength). For example, an initially bent fork member may be deformed toward a flattened configuration during recovery.

In this respect, the fork member may in some cases be heat-recoverable e.g. so that it shape changes during the heating step applied to effect recovery of the sleeve. It may, for example, be made from a heat-recoverable polymeric material as described in U.S. Pat. Nos. 2,027,962, 3,086,242 and 3,957,372 or, more preferably, be made from a memory metal.

As is known, certain alloys, commonly called "memory metals", can be used to make heat-recoverable articles, that is to say articles which have been deformed from an original configuration and which are capable of recovering towards that original configuration on heating. Amongst such memory metals, there may be mentioned, for example, various alloys of titanium and nickel which are described, for example in U.S. Pat. Nos. 3,174,851, 3,351,463, 3,753,700, 3,759,552, British Pat. Nos. 1,327,441 and 1,327,442 and NASA Publication SP 110, "55-Nitinol-The Alloy with a Memory, etc." (U.S. Government Printing Office, Washington D.C. 1972). The property of heat-recoverability has not, however, been solely confined to such titanium-nickel alloys. Thus, for example, various beta-brass alloys have been demonstrated to exhibit this property in e.g. N. Nakanishi et al, *Scripta Metallurgica* 5, 433–440 (Pergamon Press 1971) and such materials may be doped to lower their transition temperatures to cryogenic regimes by known techniques. Similarly, 304 stainless steels have been shown to enjoy such characteristics, E. Enami et al, id at pp. 663–68.

In general these metals have a transition temperature within the range of from −196° C. to +135° C., especially from −196° C. to −70° C. (this being the lowest temperature they are liable to encounter during everyday use), and thus may be brought into their martensitic state by immersion in liquid nitrogen. However, more recently, it has been found possible to "precondition" memory metals so as transiently to raise their transition temperature. This enables the article made from such alloys to be kept at room temperature prior to use, when they can be recovered by heating. Such preconditioning methods which eliminate the need for liquid nitrogen during storage and transportation, are described, for example, in German Offenlegungsschriften Nos. 2 603 878 and 2 603 911.

In some applications it will be desirable to protect the fork against corrosion, for example, an aluminium clip is preferably given a coating of an epoxy resin. However, in other applications corrosion may be unimportant, especially where the recovered heat-shrinkable sleeve is not subjected to any internal pressure, because the seal between the supply lines, once formed, should not then be in danger of being broken. In such applications it will, in general, be sufficient merely to cadmiate the fork member to provide some protection against corrosion.

Just as the configuration of the fork member may be varied according to the application, so also may the manner in which it is positioned with respect to the supply lines. There are, in particular, two basic ways in which the fork member may be so positioned.

In the first of these the fork member (generally having an odd number of prongs) is positioned above (or below) the plane containing the longitudinal axes of the supply lines so that, on shrinkage, it is forced downwardly (or upwardly) and thus rests on the upper (or lower) surface of both supply lines.

In a second method the fork member (generally having an even number of prongs) is positioned between the supply lines so that, on recovery, it is subjected to a twisting force and, as a result one of its prongs (usually an outer prong) comes into contact with the upper surface of one supply line and another (usually the opposite outer prong) comes into contact with the lower surface of the other supply line, the fork member thus remaining in position between the supply lines. This method has an advantage in that it is easier to ensure that the fork member is properly located prior to recovery and, therefore, that it is not in general necessary to provide separate means for locating it properly between the supply lines. Thus the risk of damage to the supply lines mentioned above is avoided. In addition, it has been found that it is, in practice, easier to install a fork member in this manner, especially when there is only a relatively short length of sleeve material available for threading between the prongs.

As in the method described in German Offenlegungsschrift No. 29 00 518 it may, in some instances, be appropriate to utilise an initial local heating step in the vicinity of the fork member in order to locate it firmly in position prior to the completion of shrinkage. However, in general, such a step will not be necessary.

In some preferred embodiments of the present invention the fork member, or one or more parts thereof, may be used to fulfill a secondary function, for example, it may be provided with a valve member for use with a pressurised splice case or may be used to form part of an electrical connection. Equally, whilst it is not, in general, contemplated that the fork member will be used in conjunction with other members it is possible that in some applications it may be advantageous to provide a co-operating insert member and/or to use the method of the present invention in conjunction with another method including, for example, the mastic tape method referred to above. In some instances it may be advantageous to form the fork member so that it can co-operate with the fastening means of a wrap-around device. It may even be possible to form the fork member as part of said fastening means, for example one of the central prongs of the fork member may form or be combined with said fastening means.

The heat-recoverable material of the shrinkable sleeve may be any of the polymers known from the art to be useful for the production of heat-recoverable articles. Generally the sheet material will be of constant composition throughout; however laminates of two different polymers bonded or fused together may be used in certain instances. Amongst suitable polymers there may be mentioned, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or glassy polymer such as an olefin polymer. All of the above materials may, if desired, be cross-linked for example by irradiation and/or chemical means.

As mentioned above, the internal surface of the heat-recoverable sleeve will, in general, be provided with a coating of an adhesive or a sealant such as a hot-melt adhesive or a mastic. Especially suitable hot-melt adhesives include, for example, polyamides, ethylene/vinyl acetate copolymers and terpolymers (with or without incorporated waxes) and polyesters. Such materials are described, for example, in British Pat. No. 1,440,810 and German OS No. 2,709,717. Also suitable are curable adhesives which melt and flow on heating but which will not afterwards be hot-meltable. There may also be mentioned epoxy resins and conventional mastics such, for example, as those based on butyl and isobutylene rubbers modified with suitable materials known in the art. Obviously the use or otherwise of such materials and their type, if chosen, will depend upon the particular requirements in any given case.

Of course, it will be appreciated that the fork members may be used to provide a seal between three or more supply lines coming out from a heat-shrinkable sleeve. This may be achieved quite simply by positioning separate fork members between the adjacent supply lines or, in some instances, by providing one single member which provides the necessary prongs between said adjacent supply lines.

Various embodiments of the present invention will now be described, by way of example only, with reference to the accompanying drawings, in which.

Figure 1:
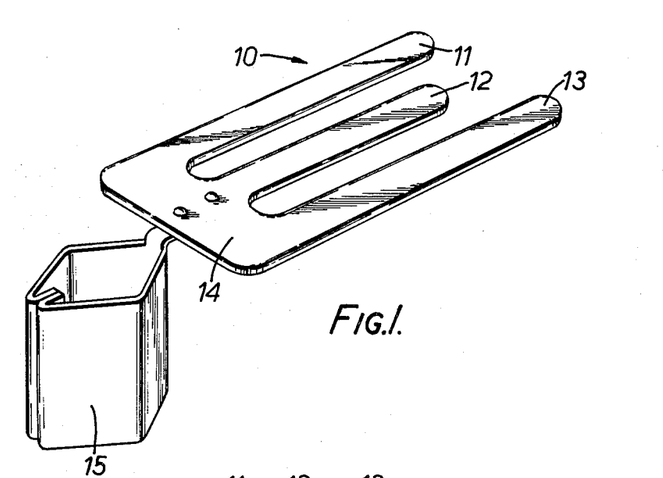
FIG. 1 shows a fork member.

Referring now to FIG. 1 the fork member 10 comprises three prongs 11, 12 and 13 and is provided at its base 14 with a deformable spacer member 15. As can be seen the central prong 12 is shorter than the outer prongs 11 and 13 to facilitate installation of the fork member 10.

Figure 2:
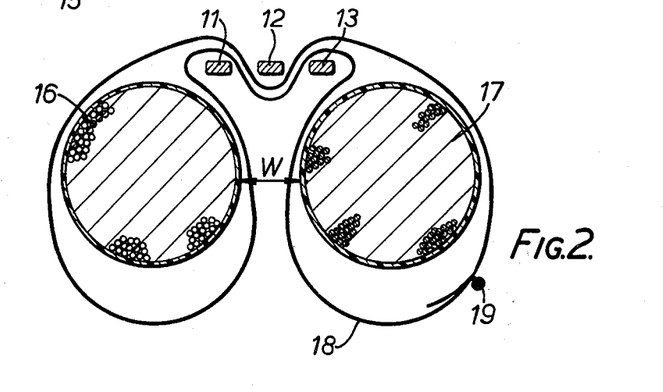
FIGS. 2 and 3 show the fork member of FIG. 1 in position for use in the method of the present invention.

FIG. 2 shows fork member 1 in position for use in the present invention. Cables 16 and 17 emerge from a heat-shrinkable wrap-around sleeve 18, having fastening means 19. In accordance with the present invention the heat-recoverable sheet material lying between cables 16 and 17 is threaded between the prongs 11, 12 and 13 of fork member 10, the spacer member 15 having been previously deformed by means of pliers to conform approximately to the distance W between cables 16 and 17. As can be seen the width of the fork member 10 across the prongs is substantially greater than W.

The spacer member 15, which may readily be broken off after recovery, is preferably insulated, at least where it contacts the cables, to prevent heat damage to the cable jackets.

Figure 3:
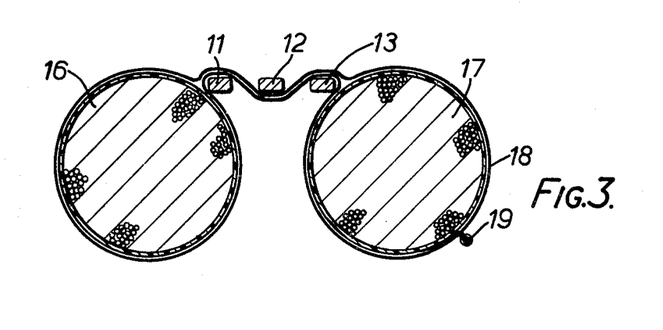
Figure 3A:
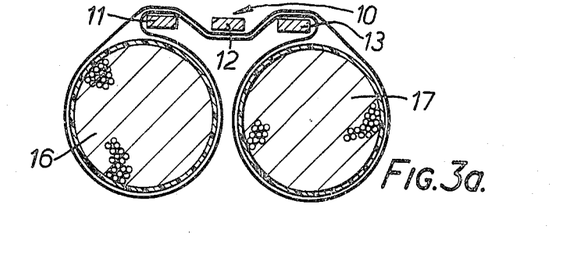
FIGS. 3a to 3d show various other uses of the fork member of FIG. 1.
Figure 3B:
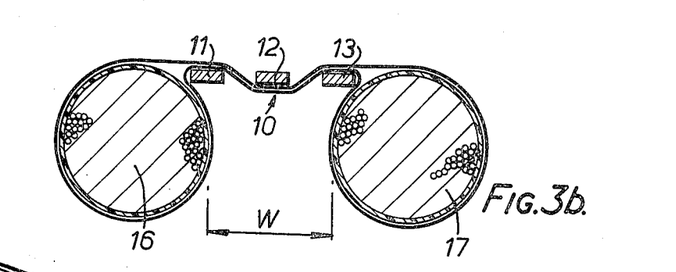

FIG. 3 shows the position after the wrap-around sleeve 18 has been heated to cause it to shrink and form tightly to the cables 16 and 17 of the fork member 10.

Figure 3C:
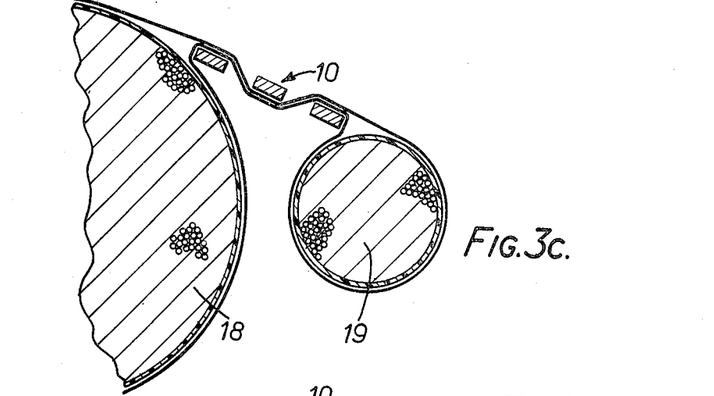
Figure 3D:
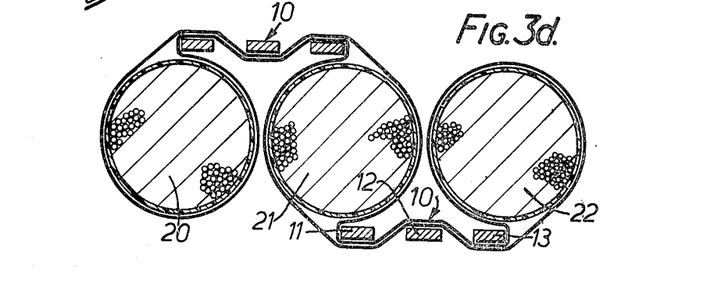

FIGS. 3a to 3d show various uses of the fork member 10 in accordance with the present invention. As can be seen, from FIGS. 3a and 3b, respectively, the fork member 10 may be employed at various spacings of the cables 16 and 17 provided, always, that the width of the fork member 10 is greater than the distance W between the cables. FIG. 3c shows that the fork member 10 may readily be employed with cables 18 and 19 of different diameter and FIG. 3d shows how two fork members 10 may be employed to form a branch-off in which three cables 20, 21 and 22 emerge from the heat-shrinkable sleeve 23.

Figure 4:
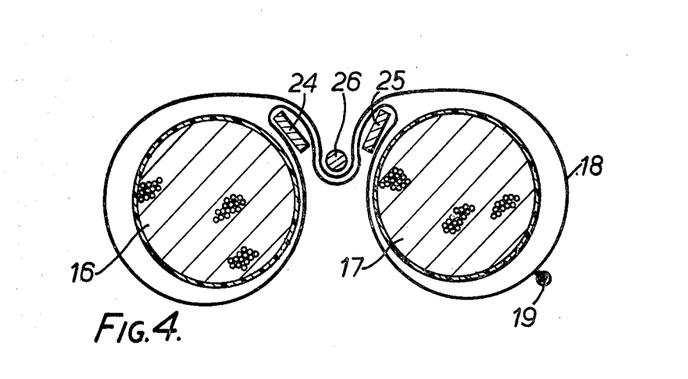
FIGS. 4 and 5 illustrate the use of further fork members.
Figure 5:
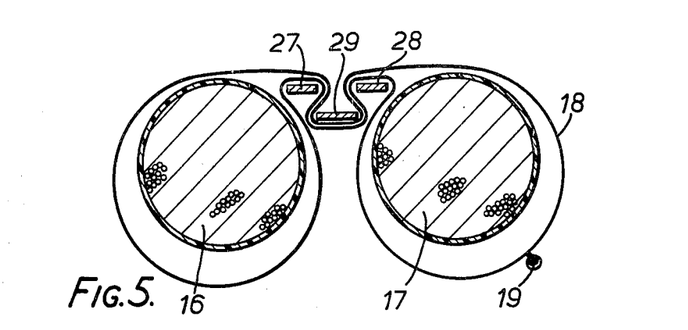

FIGS. 4 and 5 show the use of three further types of three-pronged fork members in accordance with the present invention. As shown in FIG. 4 the fork member may comprise outer prongs 24 and 25 which are generally flat in cross-section and with a central prong 26 which is of generally circular cross-section and which lies below the general plane of prongs 24 and 25.

FIG. 5 shows the use of a fork member in which the outer prongs 27 and 28 and the central prong 29 are substantially flat, but in which the central prong 29 is wider and lies below the plane of the outer prongs 27 and 28.

Figure 6:
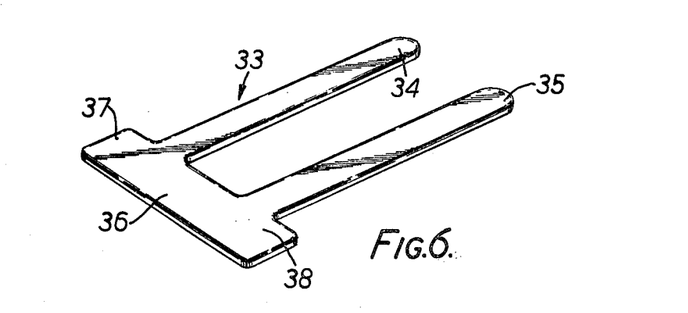
FIG. 6 shows another fork member.

FIG. 6 illustrates a further form of fork member 33 in which two flat prongs 34 and 35 extend from a base portion 36 provided with lateral ears 37 and 38.

Figure 7:
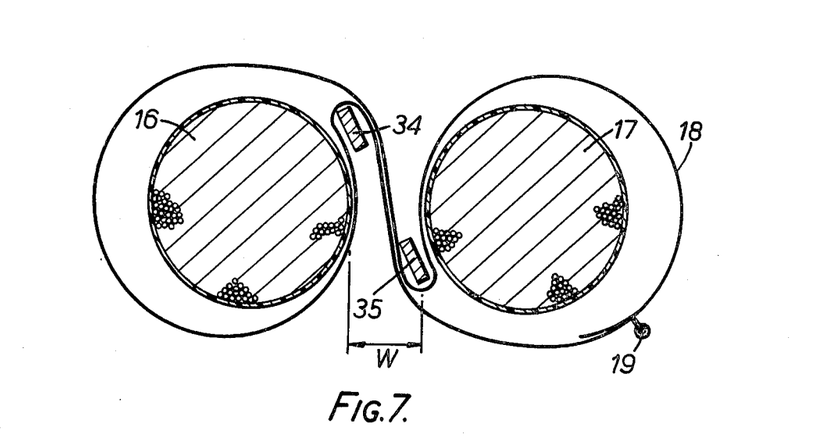
FIG. 7 illustrates the use of the fork member of FIG. 6 in the present invention.

FIG. 7 shows how fork member 33 may be used in accordance with the present invention. As will be seen in this arrangement, fork member 33 is arranged so that on recovery prong 34 comes into abutment with the upper surface of cable 16 whereas prong 35 comes into abutment with the lower surface of cable 17, the fork member 33 thus remaining in the space between the cables. It will be appreciated that, once again, it is necessary for the width of the fork member 33 across the prongs 34 and 35 to be greater than the distance between cables 16 and 17 or else the fork member 33 will be twisted into a flat configuration during recovery and will not then form the necessary seal. The ears 37 and 38 contact the jackets of the cables 16 and 17, respectively, and help to locate the fork member 33 correctly and also to prevent twisting during recovery. They are preferably thermally insulated to prevent heat damage to the cable jackets.

Figure 8:
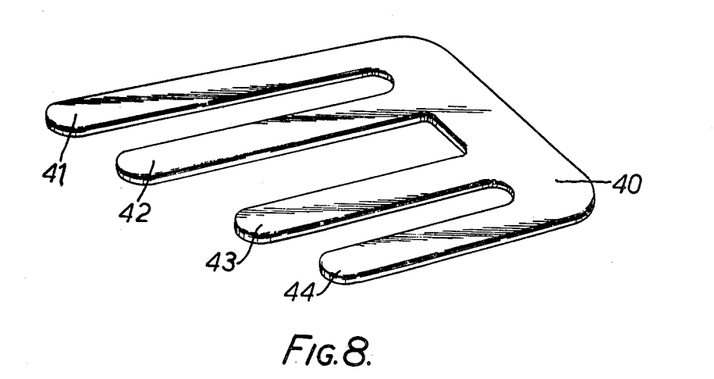
FIG. 8 shows a further fork member.

FIG. 8 shows a fork member 40 having four prongs 41, 42, 43 and 44 of different lengths. As shown, the fork member is made from flat sheet material, but it will be appreciated that in other embodiments this may not be necessary or desired.

Figure 9A:
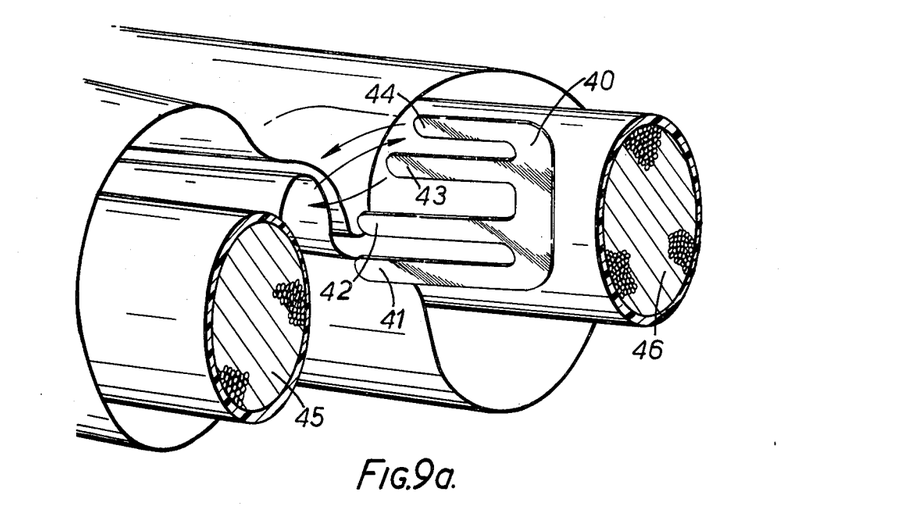
FIGS. 9a and 9b illustrate the use of the fork member of FIG. 8 in the method of the present invention.
Figure 9B:
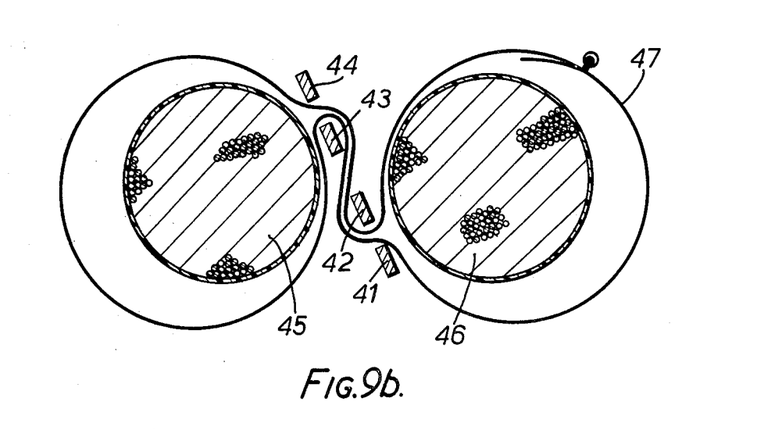

FIG. 9a shows the installation of fork member 40 within the space between two cables 45 and 46 which are emerging from a heat-shrinkable sleeve 47. As can be seen, the longer prongs 41 and 42 are first pushed round the heat-recoverable sheet material lying in the gap between the cables. After this further sheet material lying in the gap is passed between the shorter prongs 43 and 44 as indicated by the arrows. The end result is shown in section in FIG. 9b. It will be appreciated that the variation in the lengths of the prongs 41 to 44 facilitates the insertion of the sheet material in this multi-prong arrangement. On recovery the outer prong 44 comes into contact with the upper surface of cable 45 and the outer prong 41 comes into contact with the lower surface of cable 46 in a manner similar to that described above in relation to FIG. 7. This effect may or may not be enhanced by the abutment of the inner prongs 41 and 42 with cables 45 and 46, respectively. The fork member shown in FIG. 8 is especially useful in applications where there is a relatively short length of heat-shrinkable material available at the end of the heat-shrinkable sleeve member and is thus especially suitable for use with splice cases because there is no danger of the prongs damaging the case itself. A further advantage is that because the fork member 40 can readily be located between the cables 45 and 46 it is not necessary to provide it with further means such as a spacer member or lateral ears. The possibility of mechanical damage to the cable jackets is thus substantially avoided but, once again, the prongs are preferably insulated to prevent thermal damage.

Figure 10:
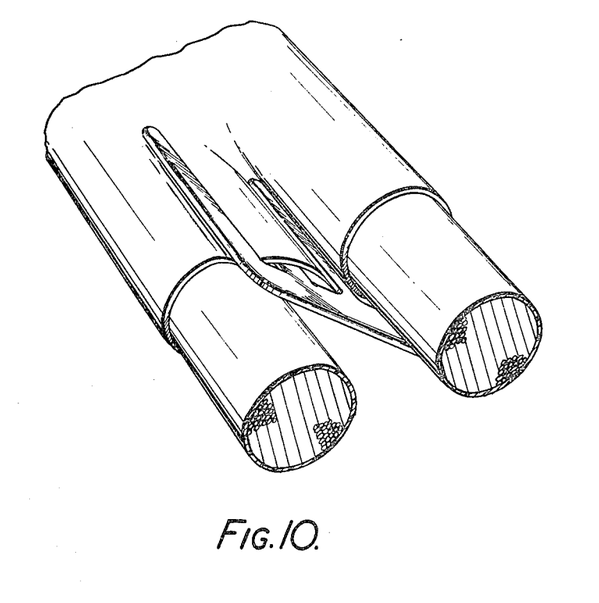
FIG. 10 is a perspective view showing the use of the fork member of FIG. 8.

A perspective view showing the use of the fork member of FIG. 8 is shown in FIG. 10.

It will be appreciated that the term "heat-shrinkable sleeve" as used herein is used in its broadest sense and includes, for example, wrap-around sleeves and endcaps as well as embodiments in which the sleeve forms part of a larger article, especially a larger heat-recoverable article and embodiments in which the sleeve is formed from two (or more) sheets of heat-recoverable material.

Other variations and modifications falling within the scope of the present invention will be apparent to those skilled in the art.

I claim:

1. A method of forming a branch-off seal between a heat-shrinkable sleeve and at least two substrates, which comprises threading an end portion of the sleeve which is positioned between the two substrates about the prongs of a fork member so that, on recovery, the heat-shrinkable material tightens within the prongs of said fork member and at least two of the prongs of the fork member abut the outer surfaces of the sleeve surrounding the substrates so as to retain the fork member firmly in position.

2. A method as claimed in claim 1, wherein the heat-shrinkable sleeve is an integral tubular sleeve.

3. A method as claimed in claim 1, wherein the heat-shrinkable sleeve is a wrap-around sleeve.

4. A method as claimed in claim 3, wherein the fork member is part of the fastening means of a wrap-around sleeve.

5. A method as claimed in claim 1, wherein the fork member is provided with means for properly positioning it in relation to the substrates before recovery of the heat-shrinkable sleeve.

6. A method as claimed in claim 5, wherein said means comprises a spacer member dimensioned to fit between the substrates.

7. A method as claimed in claim 6, wherein said spacer member is deformable so that it can be adjusted according to the distance between the substrates.

8. A method as claimed in claim 6, wherein said spacer member is attached to the fork member by a manner in which it can readily be broken off or otherwise removed after recovery.

9. A method as claimed in claim 1, wherein the fork member is provided with ears which rest on the substrates as they pass out from the heat-shrinkable sleeve.

10. A method as claimed in claim 1, wherein the fork member is made from a thermally conductive material.

11. A method as claimed in claim 1, wherein the fork member is provided with internal or self-contained heating means.

12. A method as claimed in claim 1, wherein the parts of the fork member which abut the sleeve material where it surrounds the substrates are thermally insulated.

13. A method as claimed in claim 1, wherein the fork member is made from a metal.

14. A method as claimed in claim 13, wherein the fork member is made from steel, brass, beryllium copper or aluminium.

15. A method as claimed in claim 13, wherein the fork member is a heat-recoverable member made from a memory metal.

16. A method as claimed in claim 1, wherein the fork member has been treated to protect it again corrosion.

17. A method as claimed in claim 1, wherein the fork member is deformed during recovery.

18. A method as claimed in claim 1, wherein at least two of the prongs of the fork member are of different lengths.

19. A method as claimed in claim 1, wherein the substrates are supply lines.

20. A method as claimed in claim 19, wherein the supply lines are electric cables, telecommunication cables or gas or water pipes.

21. A method of forming a branch-off seal between a heat-shrinkable sleeve and at least two substrates, which comprises threading an end portion of the sleeve which is positioned between the two substrates about the prongs of a fork member so that, on recovery, the heat-shrinkable material tightens within the prongs of said fork member and at least two of the prongs of the fork member abut the other surfaces of the sleeve surrounding the substrates so as to retain the fork member firmly in position, wherein the fork member has an odd number of prongs and is positioned spaced apart from the plane containing the longitudinal axes of the substrates as they emerge from the sleeve so that, on shrinkage, the fork member is forced toward the plane and thus rests on the surfaces of both substrates.

22. A method of forming a branch-off seal between a heat-shrinkable sleeve and at least two substrates, which comprises threading an end portion of the sleeve which is positioned between the two substrates about the prongs of a fork member so that, on recovery, the heat-shrinkable and at least two of the prongs of the fork member abut the outer surfaces of the sleeve surrounding the substrates so as to retain the fork member firmly in position, wherein the fork member has an even number of prongs and is positioned between the substrates so that, on recovery, it is subjected to a twisting force and as a result one of its prongs comes into contact with the upper surface of one substrate and another prong comes into contact with the lower surface of the other substrate, the fork member thus remaining in position between the substrates.

23. A method of forming a branch-off seal between a heat-shrinkable sleeve and at least two substrates, which comprises threading an end portion of the sleeve which is positioned between the two substrates about the prongs of a fork member so that, on recovery, the heat shrinkable material tightens within the prongs of said fork member and at least two of the prongs of the fork member abut the outer surfaces of the sleeve surrounding the substrates so as to retain the fork member firmly in position, wherein a local heating is effected n the vicinity of the fork member in order to locate it firmly in position before recovery is completed.

* * * * *